No. 731,465. PATENTED JUNE 23, 1903.
F. L. KINCAID.
HARVESTER.
APPLICATION FILED MAY 2, 1898.
NO MODEL. 3 SHEETS—SHEET 1.
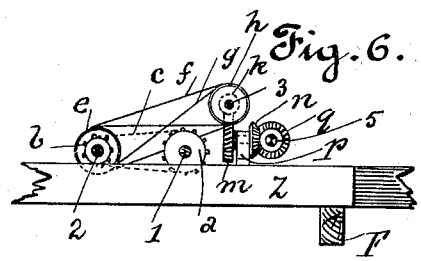
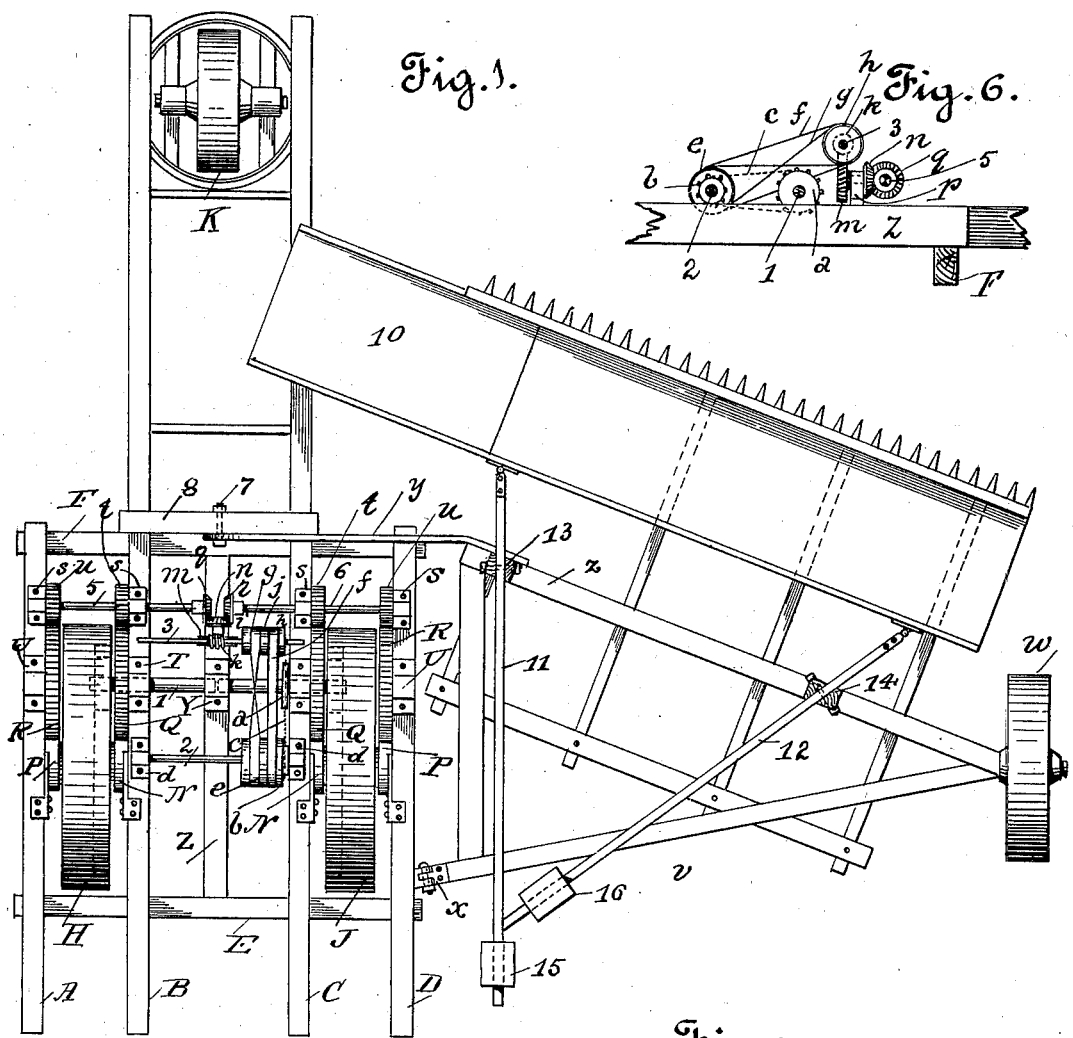
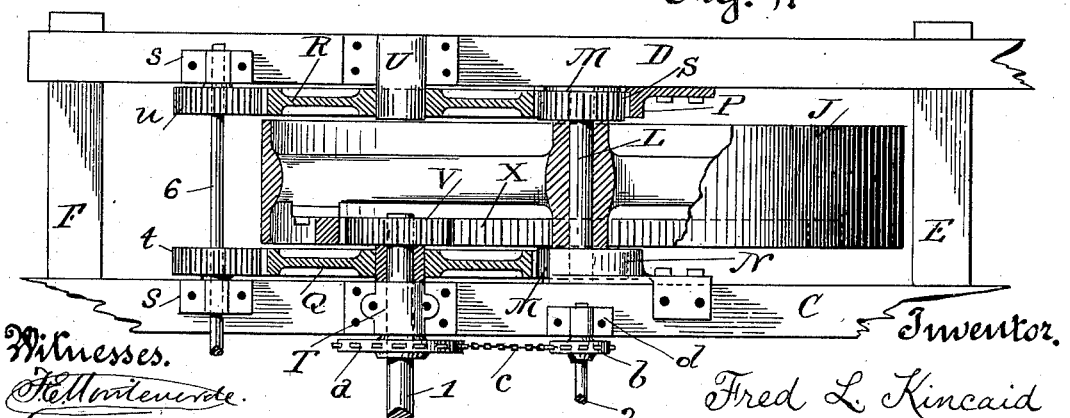

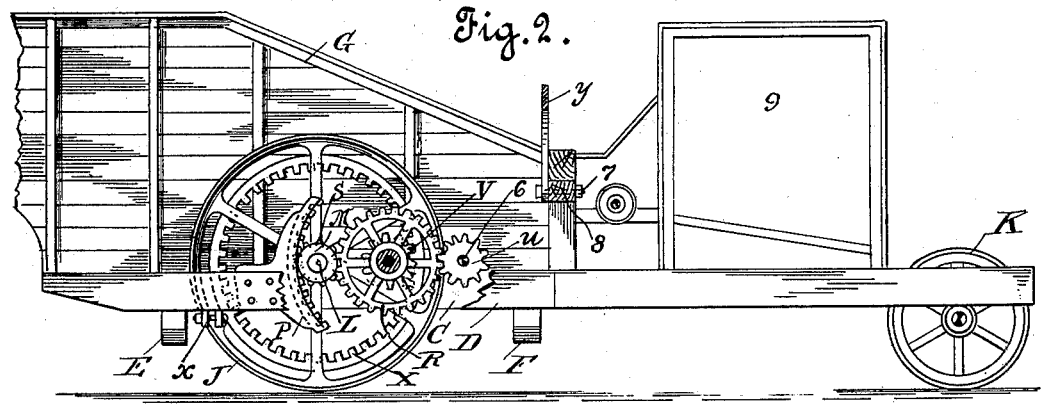
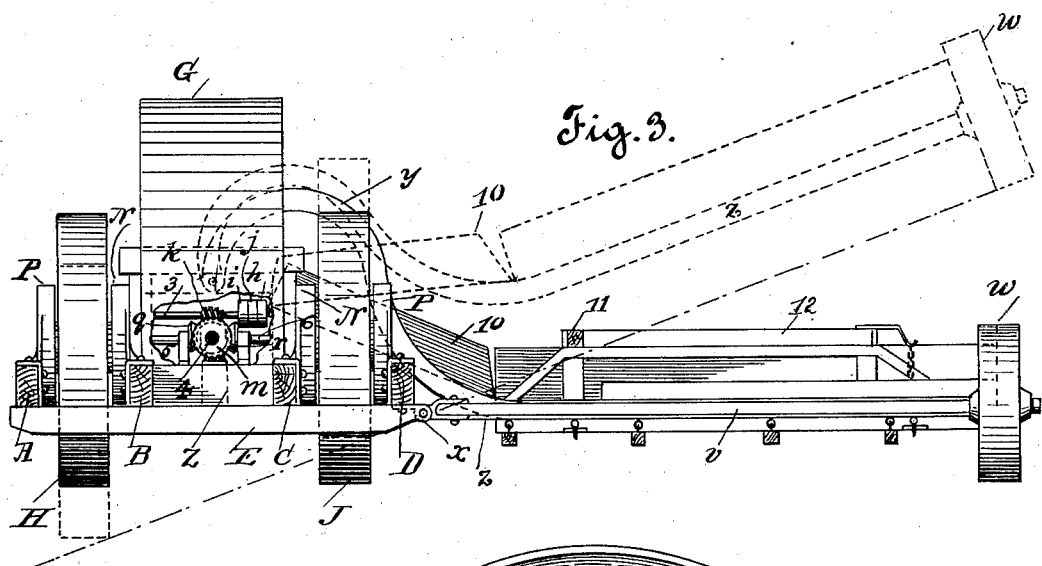
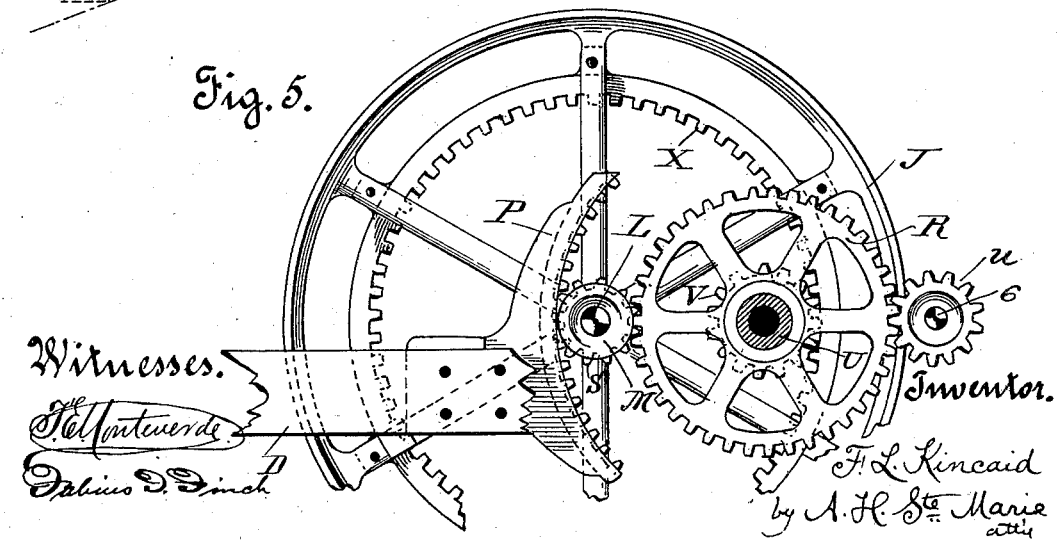

No. 731,465. PATENTED JUNE 23, 1903.
F. L. KINCAID.
HARVESTER.
APPLICATION FILED MAY 2, 1898.
NO MODEL. 3 SHEETS—SHEET 3.
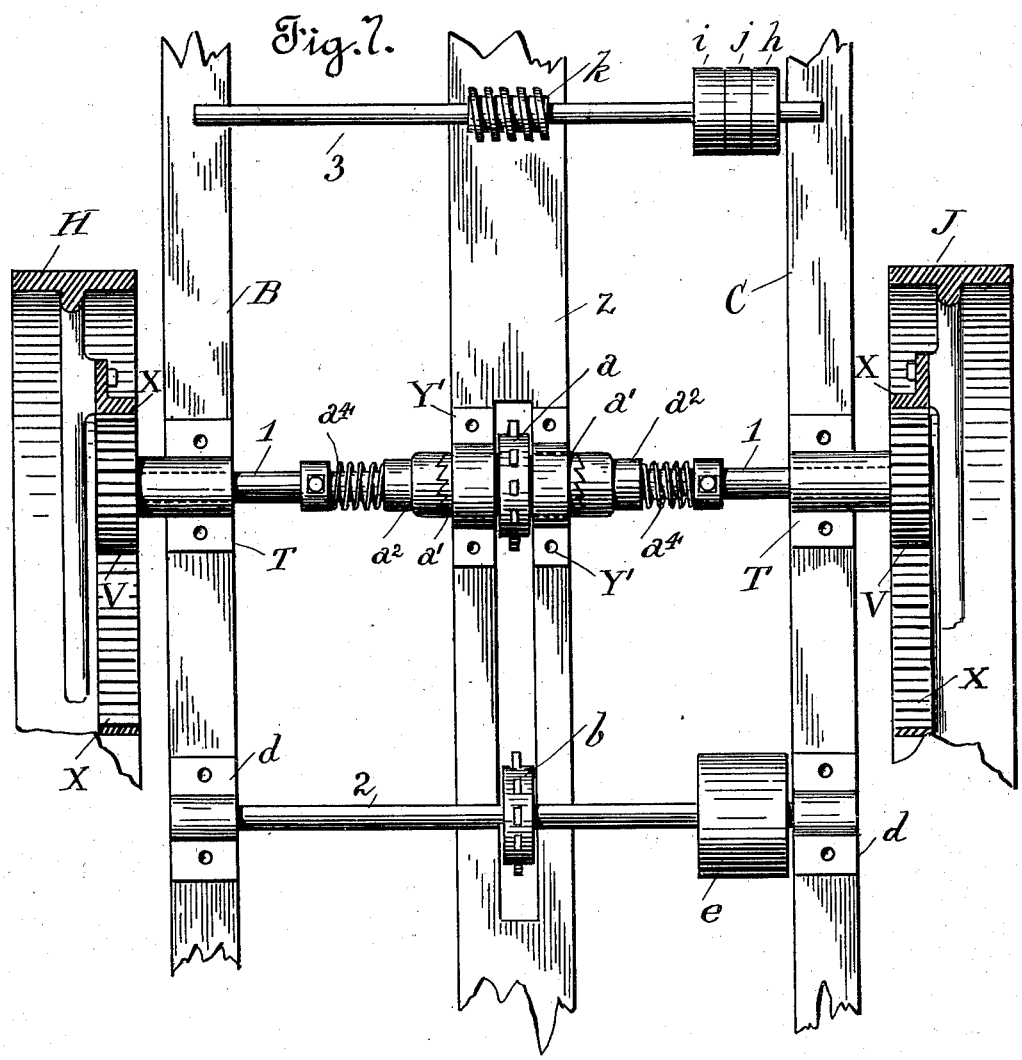
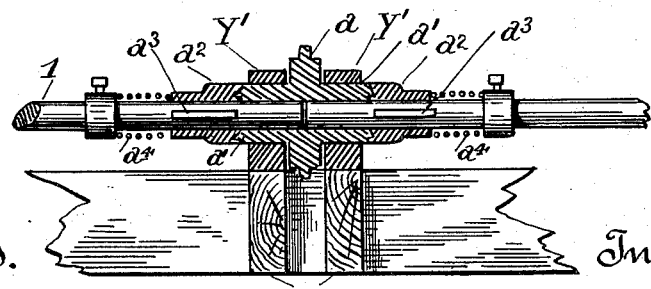
Witnesses. Inventor.
Fred L. Kincaid
by A. H. Ste Marie
atty No. 731,465. Patented June 23, 1903.

UNITED STATES PATENT OFFICE.

FRED L. KINCAID, OF STOCKTON, CALIFORNIA.

HARVESTER.

SPECIFICATION forming part of Letters Patent No. 731,465, dated June 23, 1903.

Application filed May 2, 1898. Serial No. 679,535. (No model.)

*To all whom it may concern:*

Be it known that I, FRED L. KINCAID, a citizen of the United States, and a resident of Stockton, in the county of San Joaquin and State of California, have invented a certain new and useful Improvement in Harvesters, of which the following is a specification.

My invention has reference in general to grain-harvesters that cut and thresh at the same time and are adapted to work on any sort of ground, whether level or sloping.

More particularly it relates to that species of harvester which is known in agricultural circles as a "two-wheel sidehill-harvester," because the threshing apparatus in it is mounted principally on two wheels, which are so connected with the thresher-frame that they can be made to move one up and the other down, according to the incline of the hillsides over which the machine may be traveling, and yet will permit the thresher-frame and apparatus thereon to remain in a vertical position while the cutting apparatus and frame thereof will follow the slope of the ground that is traveled over either up or down the hillsides. The two wheels supporting the threshing apparatus in machines of the species aforesaid have hitherto been provided with and placed in separate frames of their own, termed "supplemental wheel-frames" or "swing-frames," to which they are journaled independently one of the other and which separate frames are hinged to the timbers of the main frame of the thresher. This construction is far from being satisfactory, owing to frequent breakdowns resulting from the fact that the said wheel-frames have no side support when either above or below the line of the main thresher-frame and the drive-chain gets taut or slack as the frames are moved up or down, so the need is felt of improving the construction by dispensing with these additional frames altogether and providing better means of connecting the wheels to the thresher-frame. It is desirable in harvesters of this species to have a construction that will permit the main supporting-wheels to be raised and lowered readily and at the same time to provide for them a rigid connection with the main thresher-frame at all points or in whatever position they may be with regard to it, so as to overcome the strain consequent upon the side thrusts of the wheel-bearings when operating on steep hillsides.
It is also desirable when raising and lowering these wheels to have them travel in an arc of a circle, the radius of which has its center at the main driving-shaft of the harvesting machinery, in order that the traction-power of the said wheels may be utilized to drive said shaft. It is further desirable to so connect the header with the thresher that their frames may change their positions relatively to each other, while the header-spout leading into the feeder-house will remain approximately in the same position always as regards end thrusts, and the cutter-bar will at all times be parallel with the surface of the ground.

It is the aim of my invention to supply these several desirable features of construction. I attain these features, first, by placing the main-wheel axles in movable bearings that are adjustably connected with the thresher-frame by gearing which is itself rigidly connected to the said frame; secondly, I so locate the said wheel-bearings that they can be shifted and locked in position by said gearing as required about a fixed point which is the center of the driving-shaft for the threshing apparatus; thirdly, the double object of preventing end thrust of the header-spout and maintaining the cutter-bar in the same relative position to the surface of the ground at all times is accomplished by connecting the front timber of the header-frame, which regulates the height of the cutter-bar, flexibly to the thresher by means of a gooseneck pivoted at a point within the machine on a vertical plane passing centrally through or between the main point or points of support of the thresher and at a height that would correspond to the bottom line of the header-spout if extended to the same plane.

I am aware that it was proposed some years past to leave out the wheel-frames of two-wheel sidehill-harvesters and have instead on their axles some fixed pinions that were to be held in mesh with vertically-disposed racks ahead through the agency of sprocket wheels and chains; but the scheme was so crude and inoperative that it could not be reduced to practice, chiefly because it afforded no means for using the traction-power of the principal supporting-wheels to drive the harvester machinery or the devices through which the wheels of the thresher were to be raised and lowered.

I shall now proceed to describe my said invention in detail with reference to the three sheets of drawings hereto annexed, which form an integral part of this specification.

In the said drawings, Figure 1 is a top plan giving a general outline of a harvester embodying my invention with the threshing apparatus and so much of the machinery as need not be shown here removed. Fig. 2 is a partly-broken elevation of the right-hand side of the thresher part of said harvester. Fig. 3 is a rear elevation of the whole machine, the thresher being partly broken to show the inside gearing that allows its wheels to be raised and lowered. Fig. 4 is a plan, partly in section and partly broken, of one of the thresher-wheels with its movable bearings and part of the gears connected therewith. Fig. 5 is a broken elevation of some of the parts represented in Fig. 4 looking down toward the upper line thereof, which indicates the right-hand side of the thresher-frame. Fig. 6 is a detailed view showing in side elevation the inside gears that appear in plan and in rear elevation in Figs. 1 and 3. Fig. 7 is a plan view similar to the central portion of Fig. 1. Fig. 8 is a vertical cross-section of certain parts of the construction illustrated in Fig. 7.

Similar letters and numerals refer to similar parts throughout all the figures.

The letters A B C D designate the main longitudinal timbers of the thresher-frame, and E F are the cross-timbers joining the same. G is the casing of the threshing apparatus that is mounted on said frame. The thresher-frame and apparatus thereon are borne principally by two wheels H and J, which are located on opposite sides of said thresher-frame between the timbers A B and C D, respectively. A third wheel K, placed centrally forward of the thresher, is also used in addition; but this third wheel serves mostly to keep the thresher in equilibrium and to steer the machine while traveling. Separate axles, such as L, are provided for each one of the main wheels H and J, and the two said axles are fitted or journaled at both their ends in movable bearings or boxes M. These bearings or boxes are adjustably connected to the longitudinal timbers A B C D of the thresher-frame by gearing consisting of toothed arcs or segmental gears N P N P and idler-gears Q R Q R, which arcs and idlers are placed on opposite sides of said bearings or boxes and mesh into gear-teeth S, provided on the periphery of the same. The arcs or segmental gears are at the back and are bolted or otherwise firmly secured to the thresher-frame, having their concave side turned forward, where are formed the teeth that engage the corresponding teeth on the boxes M. The idler-gears are in front and are also secured on the thresher-frame, the inner gears Q being hung on boxes T, wherein are journaled the ends of a shaft numbered 1, described hereinafter, and the outer gears R being hung on similar boxes or like bearings U in line therewith. Thus there are on the two main-wheel axles two pairs of bearings or boxes loose thereon, but at the same time geared with and controlled by two corresponding pairs of arcs and idlers on opposite sides, one arc and one idler being provided for each bearing or box, as shown in the several figures of the drawings. The teeth on the arcs and on the wheel-boxes are shrouded to the pitch-line, as indicated in Figs. 2, 4, and 5, both the arcs and boxes being flanged to afford a better rolling contact between them and also to act as guides for the boxes. The idler-gears could also be shrouded or flanged in a similar manner, if desired.

Shaft No. 1, above referred to, is the driving-shaft for all the machinery of the harvester and is itself driven by the traction-power afforded by the main thresher-wheels, to which it is geared by means of pinions V, keyed to its ends and meshing with annular gear-wheels X, bolted to the spokes of said main wheels on the inside of each. It is made in two sections, which may be either independent or coupled together. In the form of harvester illustrated in the drawings hereto annexed I have shown these shaft-sections independent one of the other with their inner ends journaled in a common bearing or box Y, bolted on a central timber Z, placed lengthwise of the thresher-frame, their outer ends being journaled in the boxes T, on which are hung the idlers Q and which are in line with the boxes or bearings U of the idlers R, as hereinbefore described. Being divided, the shaft 1 will allow the outer wheel to run faster than the inner one when turning curves or going around the corners of a field, and all torsional strain will thus be avoided. It will be observed, however, that the shaft-sections may also be made to perform the same work if coupled together by means of a double clutch, and the use of such a coupling is therefore within the scope of my invention.

The inside of the segmental gears N P N P is curved to the common center of the idler-gears Q R Q R and of the driving-shaft No. 1. The boxes M, that are caught between said gears, are thereby confined each within an arc of a circle that is concentric with shaft No. 1, and no matter at what point they may be in said arc they will be always at the same distance from the center of said shaft. The segmental gears N P, it will be understood, can be extended farther up and also farther down than has been shown in the drawings accompanying this specification, and, furthermore, the ends of the same may be fastened to the thresher at any convenient point beyond the thresher's main wheels, thus imparting all the rigidity required to said gears and the boxes and other parts connected therewith. It will now be seen that the axle-boxes M, being geared as described, afford a connection between the thresher and main thresher-wheels, whereby the former is supported on the latter. This connection is adjustable, because the gears can be moved to rotate the said boxes either way, so that the thresher-wheels may be easily and quickly raised or lowered in conformity with the slope of the ground on which they bear, while the frame mounted on them may remain level with the horizon. The said connection, on the other hand, becomes rigid upon checking the movement of the gears, and can thus be made rigid at any desired point within the path along which the rotary bearings or revolving boxes M may respectively roll up and down. It follows from the uniform rigidity of the connection that the thresher-wheels are securely held in any position that they may occupy and they maintain a constant relation at right angles to the thresher-frame irrespective of their vertical movements. The strain that would otherwise result from side thrusts of the axles or their bearings is thereby avoided or overcome. It will further be seen that on account of the particular position in which the rotary axle-bearings are placed and adapted to move in they will operate to keep the main thresher-wheels always at a uniform distance from the shaft 1, and consequently the traction-power of said wheels can be applied to said shaft to drive the same and all the harvester machinery without danger of any of the parts ever getting deranged by the shifting of said wheels on uneven ground. It also becomes possible for the same reason to actuate from the shaft the mechanism that allows the said wheels to be raised and lowered with relation to the thresher-frame.

The wheels H and J are held in operative position and shifted whenever necessary—that is to say, caused to move vertically in opposite directions according to the declivities of the ground and locked in the proper position to maintain the thresher-frame level by means of the following-described mechanism: The driving-shaft No. 1, hereinbefore described as being geared with the main wheels of the thresher through the pinions V and annular gear-wheels X, is also geared with and drives a counter-shaft numbered 2 by means of sprocket-wheels $a\,b$ and a sprocket-chain $c$. (See Figs. 1, 4, and 6.) This counter-shaft is placed across the thresher-frame parallel with the shaft No. 1, and like it is journaled in boxes $d$, bolted to the timbers B C of said frame. The counter-shaft No. 2 in turn drives another counter-shaft numbered 3, which is placed somewhat farther forward than the shaft 1 and at a higher elevation within the thresher, where it is provided with suitable bearings. There is a fixed pulley $e$ on counter-shaft No. 2 wide enough to carry two belts $f\,g$, one open and the other crossed, and these belts are arranged to run around the said fixed pulley and also alternately around either of two loose pulleys $h\,i$ and a fast pulley $j$, located on counter-shaft No. 3, so that the latter may be turned in either direction, according to which belt is shipped over the said fast pulley. Counter-shaft No. 3 carries a screw $k$, which is in mesh with a worm-wheel $m$, keyed to one end of a short counter-shaft numbered 4, to the other end of which is fixed a miter-gear $n$. Counter-shaft No. 4 has its bearing $p$ on the middle timber Z of the thresher-frame in line with the box Y of the thresher-frame, provided thereon for shaft No. 1. The miter-gear $n$ is in mesh on opposite sides with similar gears $q$ and $r$, secured, respectively, to the inner ends of two other counter-shafts numbered 5 and 6, which extend out to the sides of the thresher-frame across the timbers A B and C D, where they have their bearings $s$ at a suitable distance forward of the thresher-wheels. To each of these counter-shafts 5 and 6 are keyed a pair of pinions $t\,u\,t\,u$, that are in mesh with the idler-gears Q R Q R.

From the foregoing it will be seen that the power to raise and lower the main thresher-wheels as well as to drive the entire machinery is derived from the traction of the said main wheels and is transmitted from them, or either of them, by means of the internal gears X, that are meshed with the pinions V of the main driving-shaft No. 1. Shaft No. 1 drives counter-shaft No. 2 by the sprocket-wheels $a\,b$ and chain $c$. Counter-shaft No. 2 will drive counter-shaft No. 3 in either direction through the agency of the pulleys $e$ and $j$ and belts $f$ and $g$ whenever these belts are slipped onto the fast pulley $j$ from the loose pulleys $h\,i$, on which they normally run—that is to say, when the open belt $f$ is taken off the loose pulley $h$ and run on the fast pulley $j$ it will cause counter-shaft No. 3 to rotate in one direction, and when instead the crossed belt $g$ is shipped over from the loose pulley $i$ to said fast pulley it will turn said counter-shaft in the other direction. Counter-shaft No. 3 when rotated in either direction will drive shaft No. 4 in one direction or the other through the screw and wheel $k\,m$, and consequently the miter-gear $n$ thereon will revolve also in one direction or the other, according to which way counter-shaft No. 3 is turned. Counter-shaft No. 5 and counter-shaft No. 6 are driven by shaft No. 4 in opposite directions through the medium of the miter-gears $n\,q\,r$ whenever the last-named shaft is rotated. Counter-shafts Nos. 5 and 6 are adapted, through their pinions $t\,u$, to drive the idler-gears Q R, which revolve on the same common center as the main driving-shaft of the machine, and, in fact, are hung on the outside of the boxes T of the said driving-shaft, on the inside of the thresher-frame, and on similar boxes U, set in the same line on the outside of the said frame, as previously explained, and the idler-gears are in mesh with the gear-teeth on the outside of the main wheel rotating bearings M, which in turn are in mesh with the teeth on the inside of the arcs N P, that are curved to the common center of the said idler-gears and main driving-shaft and which are bolted securely to the frame of the thresher. By this it will be seen that when counter-shafts Nos. 5 and 6 are set in motion in opposite directions and in turn drive the idler-gears on each side of the thresher in opposite directions the rotary bearings will climb up the teeth of the arcs on one side of the thresher and descend on the opposite side and the arcs being bolted to the thresher-frame that the thresher can be made to maintain an upright position when going along the side of an inclined piece of ground, though its wheels run at different levels, as indicated by the dotted lines in Fig. 3 of the drawings, or the reverse, as the case may be. It will be seen, further, that the arcs having the same common center as the idler-gears and main driving-shaft the rotary bearings and wheel-axles therein will always be at the same distance from the common center, where the traction-power of the main thresher-wheels is applied.

The double clutch for the shaft 1, hereinbefore mentioned, is illustrated in Figs. 7 and 8, wherein $Y'$ $Y'$ represent a divided box which takes the place of the box Y of the preceding figures. $a'$ $a'$ are elongated hubs of the sprocket-wheel $a$, which is moved to the center of the thresher-frame. These hubs $a'$ are the journals supporting the said sprocket-wheel $a$ in the divided box $Y'$ and are each provided with ratchet-teeth. Furthermore, the said hubs $a'$ act as bearings for the inner ends of the sections of the shaft 1. $a^2$ $a^2$ are clutch members having teeth to engage the teeth of the hubs $a'$ and driven by feathers $a^3$ $a^3$ of shaft 1. $a^4$ $a^4$ are spiral springs used for holding the clutch members $a^2$ normally in engagement with the hubs $a'$. The sprocket-wheel $a$ is supposed to be geared back with the sprocket-wheel $b$ by means of a sprocket-chain, as in the other figures, said sprocket-wheel $b$ being also moved to the center of the thresher-frame for this purpose.

To the right of the thresher is to be found the header part of the machine, in the frame of which $z$ is the main timber. This timber controls the height of the cutting device from the ground by carrying the weight of the same on the end of levers 11 and 12, fulcrumed, respectively, at 13 and 14 over the aforementioned timber $z$ and counterbalanced by means of weights 15 and 16. On the right the header-frame is supported on a single wheel $w$, the axis of which is preferably brought into line with the axes of the main thresher-wheels H J. On the left the main timber $z$ is flexibly attached to the separator or fore part of the thresher by means of a gooseneck $y$, made of a strong wrought-iron plate or bar rigidly secured at one end to the said timber $z$ and reaching up at its other end to a point on a middle longitudinal line of the thresher and at a height from the ground corresponding to the line of the bottom of the header-spout if it were carried to the said middle longitudinal line. The gooseneck is pivotally attached at this point by a bolt 7 to a cross-timber 8 back of the feeder-house 9, which receives the upper end of the header-spout 10. By middle longitudinal line of the thresher is meant a line taken from a vertical plane passing midway between the main bearing-wheels of the thresher if the same is of the "two-wheel" species, as herein described; but were the thresher to be of the "single-wheel" type—that is to say, mounted on and resting mainly on a central wheel—then the said line would be from a plane passing through the center of said single wheel, for it will be understood the improved connection herein set forth for the header and thresher is applicable to the entire class of "sidehill harvesters" of whatever species they may be. Being connected or coupled as described, the header and thresher can readily change their position relatively to each other, so that the header will be enabled to adjust itself to the surface of the ground while the thresher remains upright irrespective of the angle of tilt of the header with relation to it. Owing to the particular point at which the gooseneck is attached it will be seen that the main timber $z$ of the header-frame and the cutting device attached thereto will at all times maintain an exact parallelism with the surface of the ground and that the upper end of the header-spout will always be at its proper place inside the feeder-house, where its bottom edge lies in a practically immovable position incapable of end thrust.

An illustration of the manner in which the several parts of the machine can change positions with relation to each other is given in Fig. 3 of the drawings, where the oblique line drawn across said figure represents the ground-line of a hillside and the dotted lines show the respective places occupied by the different shiftable parts of the machine when on such ground. The back timber $v$ of the header-frame is flexibly coupled to the thresher-frame by a hinge $x$, the pin of which is sufficiently loose to avoid torsion of the said timber whenever the front timber $z$ and the cutting device controlled thereby change their position with relation to that of the thresher.

It will be observed that various changes could be effected in the construction herein disclosed and still the same or practically the same results would be arrived at. Thus, for example, the main wheels of the thresher could be made to move in an arc the very opposite of that described herein. Again, sprocket wheels and chains or gearing could be substituted for the pulleys and open and crossed belts used to drive counter-shaft No. 3, and generally many other such alterations could be effected in the power-transmitting connections. The gooseneck also that flexibly connects the header with the thresher need not be pivoted at the exact point herein specified. This point is selected merely to show how to obtain the best mechanical results; but it is conceived that my improved harvester would still work fairly well if the pivotal connection of the gooseneck were removed a short distance from the exact point described. These and similar changes will be obvious to skilled mechanics, and they all fall within my invention, which it is my purpose to claim in all its forms and in the broadest possible manner.

What I claim, and desire to secure by Letters Patent of the United States, is—

1. A thresher provided on opposite sides with bearing-wheels on which it is adjustably mounted, a main shaft for the machinery of the thresher driven by the traction-power thereof, means for guiding said wheels in arcs of vertical circles having a common center with said shaft, and power connections whereby the wheels can be made to move one up and the other down in said arcs.

2. A thresher comprising a frame having a toothed arc fixed to it on each side, bearing-wheels, boxes loose on the axles of said bearing-wheels and provided with teeth on their peripheries meshing into the arcs of said frame, a shaft concentric with said arcs, run by bearing-wheel traction, and drive connections from said shaft to said boxes to move the same one up and the other down along the arcs.

3. A thresher provided with two bearing-wheels located on opposite sides, toothed arcs fixed to the thresher-frame by the side of said wheels, idler-gears located opposite to said arcs, rotary bearings placed loosely on the wheel-axles and having teeth in mesh both with said arcs and said gears, a mechanism adapted to normally check the movement of the gears so as to keep the wheels' bearings locked in position, and means to actuate said mechanism and transmit motion to the gears in order to rotate the bearings and thereby cause them together with the wheels to traverse the arcs in opposite directions on opposite sides of the machine, substantially as specified.

4. A thresher having two side wheels, flanged and toothed rotary bearings loose on the axles of said wheels, flanged segmental gears engaged by said bearings, idler-gears also engaged by said bearings oppositely to said segmental gears, and gearing which is normally at rest but can be actuated at will to rotate said idler-gears in opposite directions, substantially as specified.

5. A thresher having wheels on opposite sides and rotary toothed bearings for the axles thereof, toothed arcs fixed to the thresher-frame and in mesh with said bearings, idlers also meshing with said bearings oppositely to the arcs, an internal gear carried by one wheel, and intermediate connections between said internal gear and idlers whereby the traction-power of the machine can be transmitted to the rotary bearings to move the same up and down along the arcs, substantially as specified.

6. A thresher provided with bearing-wheels on opposite sides, boxes having teeth on their peripheries and loosely placed on the axles of said wheels, toothed arcs fixed to the thresher-frame and engaged by said boxes, idlers likewise engaged by the axle-boxes and holding the same to said arcs, a driving-shaft having a common center with the idlers and the arcs and driven from one bearing-wheel, and power connections between said driving-shaft and the idlers whereby the same can be made to rotate the axle-boxes and move the wheels in opposite directions concentrically with the driving-shaft, substantially as specified.

7. A harvester comprising a thresher adjustably supported on side wheels adapted to be moved vertically in opposite directions to conform with declivities of the ground while the thresher-frame remains level with the horizon, a header having a wheel-support at its outer end and hinged to the thresher at its inner end, and a gooseneck pivotally attached to the thresher substantially on a level with the inner end of the header-spout and rigidly secured to that part of the header-frame which controls the height of the cutting device from the ground and carries the header-spout, the same operating to keep the cutting device and header-spout in proper position, substantially as specified.

8. A sidehill-harvester comprising a thresher mounted on one or more lines of bearing-wheels, a header having a wheel-support for its outer end and provided at its inner end with a spout discharging into the thresher, and a device flexibly connecting the main timber of the header-frame, that controls the cutting device and header-spout, with the thresher, substantially on the level of the inner end of the header-spout, substantially as specified.

9. In a machine of the nature described, the combination of a thresher having two main bearing-wheels, means enabling said wheels to be shifted vertically in opposite directions, a header, and a gooseneck flexibly connecting that part of the header which regulates the height of the cutter-bar with the thresher at a point midway between and forward of the main bearing-wheels and at a height practically on a line with bottom of the header-spout, substantially as specified.

10. A thresher having side wheels, rotary toothed bearings on the wheel-axles, toothed arcs fixed to the thresher-frame and in mesh with the bearings on one side, idlers also in mesh with the bearings on the opposite side, a gear secured to one wheel, a driving-shaft, a pinion keyed to said shaft and meshing with said gear, a counter-shaft and operating connections between this second shaft and the driving-shaft, a third shaft and suitable connections whereby the same can be rotated in either direction from the second shaft, a fourth shaft and gearing to drive it from the third shaft in either direction, a fifth and sixth shafts both geared with the fourth shaft so they will turn in opposite directions, and pinions keyed to both the fifth and sixth shafts and respectively engaging the idlers on the opposite sides of the machine, substantially as specified.

11. A thresher having side wheels, toothed arcs fixed to the thresher-frame and geared with the axles of said wheels, idlers also geared with the wheel-axles oppositely to said arcs, a mechanism adapted to normally check the movement of the idlers and maintain the wheels in position, and means to actuate said mechanism from the traction-power of one of the wheels and rotate the idlers, thereby causing the wheels to move up and down along the arcs in opposite directions, substantially as specified.

12. A thresher provided with bearing-wheels on opposite sides on which it is adjustably mounted, rotary boxes loose on the axles of said bearing-wheels and having teeth on their peripheries, toothed arcs meshing with said rotary boxes, idler-gears also meshing with said rotary boxes oppositely to said arcs, and power-transmitting connections whereby the bearing-wheels can be made to move one up and the other down concentrically with said idler-gears, substantially as specified.

FRED L. KINCAID. [L. S.]

Witnesses:
A. H. STE. MARIE,
HENRY P. TRICOU.